United States Patent Office 2,891,813
Patented June 23, 1959

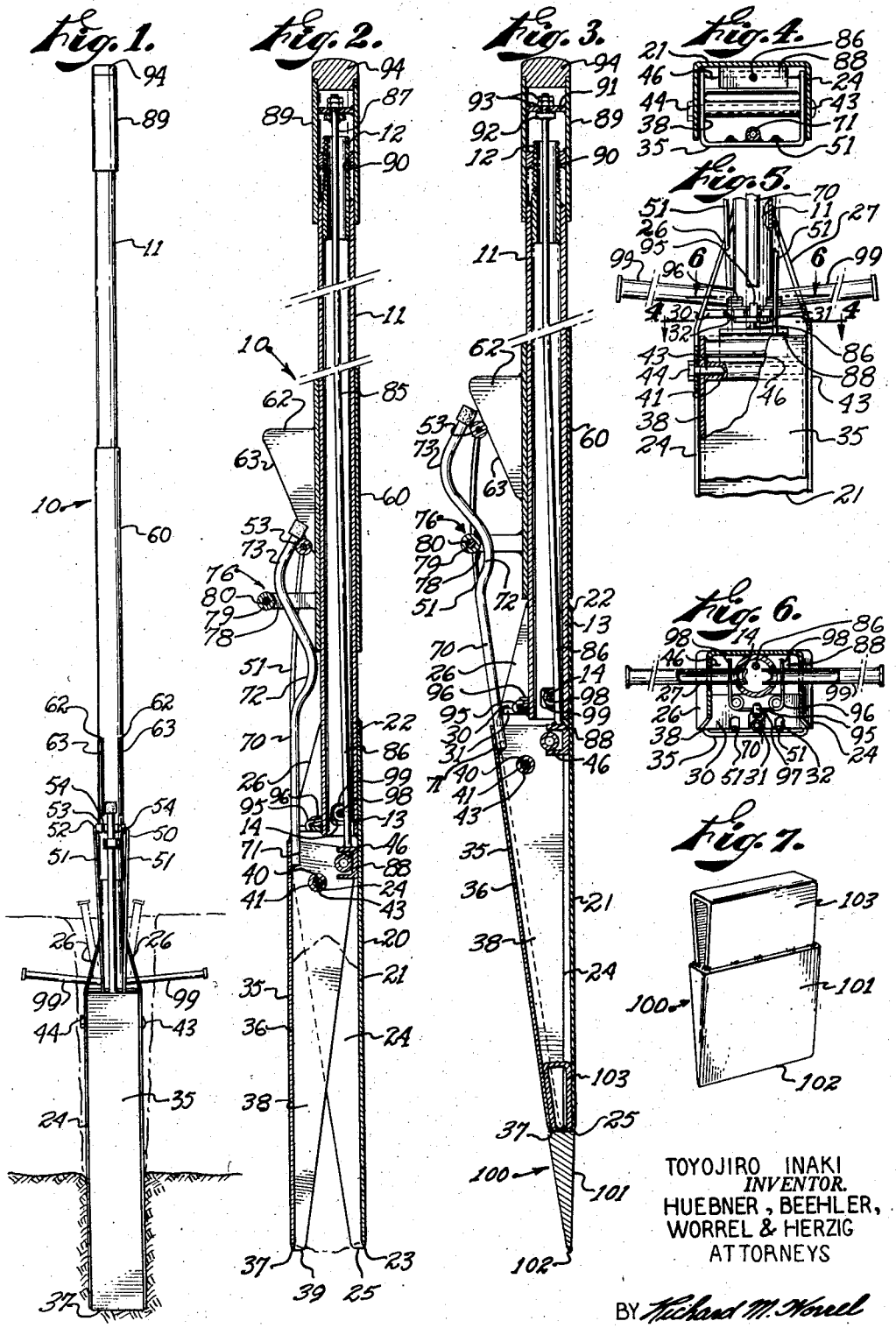

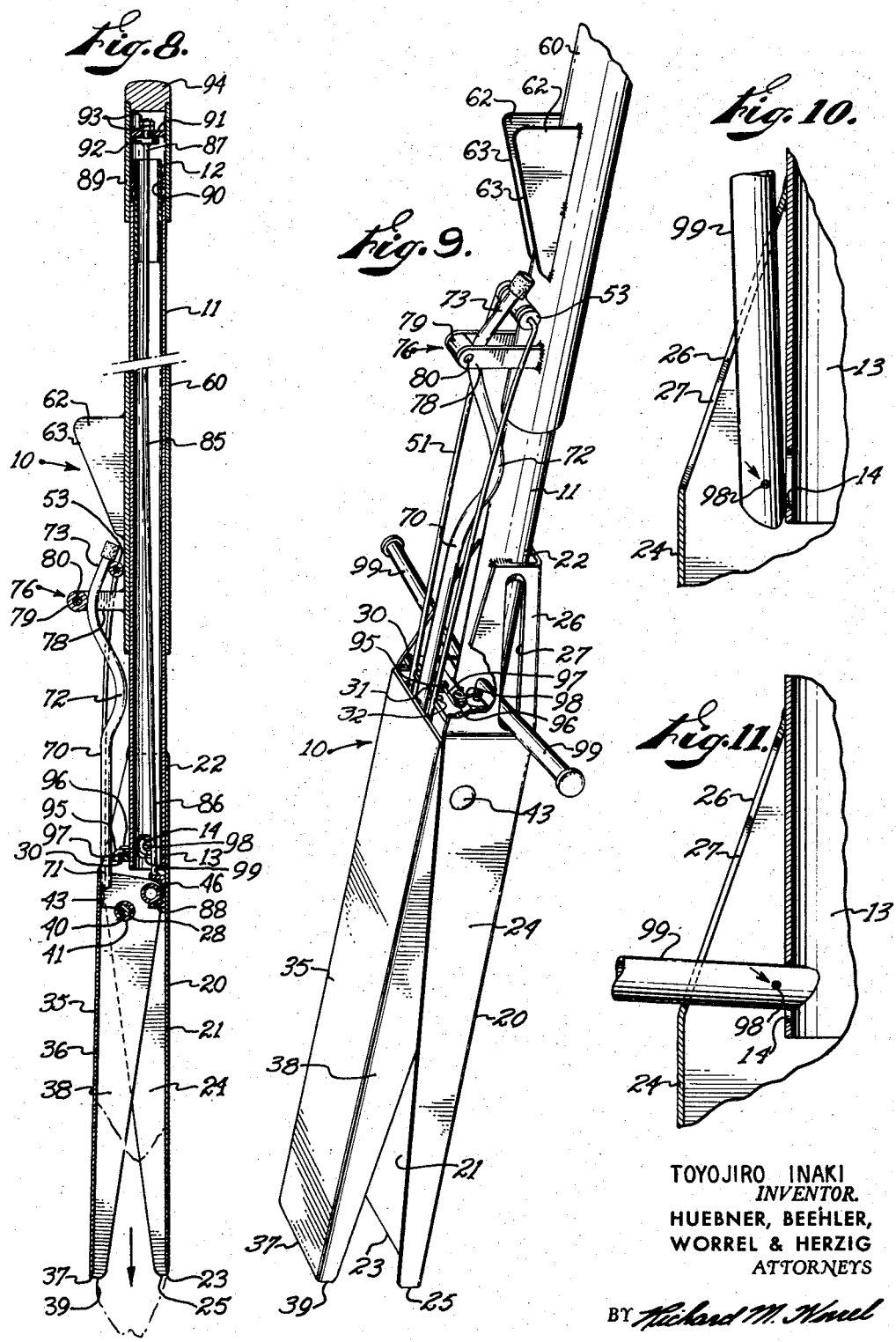

2,891,813

MATERIAL HANDLING TOOL

Toyojiro Inaki, Fresno, Calif.

Application July 12, 1956, Serial No. 597,475

7 Claims. (Cl. 294—50.6)

The present invention relates to a material handling tool and more particularly to a post hole digger.

It is conventional to support grapevines on substantially erect posts known as grape stakes and set in the ground adjacent to the plants. In grape producing regions of the country it is common for an average vineyardist to employ thousands of these grape stakes. It will be appreciated that the task of placing these stakes in the ground is one of considerable magnitude.

In the past several devices have been used for setting grape stakes in the ground. For example, the stakes have been forcibly driven into the ground by a sledge hammer; a device consisting of a sleeve or pipe having radially extended handle bars, an open end and an opposite closed end has been fitted over a stake and slid up and down on the stake thereby to pound the latter into the ground; and holes for receiving the stakes have been dug with conventional shovels. It will be evident that all of these methods are tedious and time-consuming, especially considering the large number of stakes which must be set. Further, these methods have been inefficient. For example, a sledge hammer frequently splits or otherwise damages the stakes; and a conventional shovel generally removes more dirt than is necessary so that the stakes have been unsteady and not firmly supported in the ground. In addition, there are other problems such as where hardpan is involved and where stakes have broken off leaving only portions thereof in the ground which the present invention is intended to overcome.

Accordingly, it is an object of the present invention to provide an improved tool for digging holes in the ground.

Another object is to enable the digging of holes and removal of soil from the ground in a more efficient, easier, and less time-consuming manner.

Another object is to enable the digging of holes of small diameter and to remove only small amounts of dirt as is necessary.

Another object is to provide a device for vigorously digging and chopping of hard soils, roots, and the like.

Another object is to provide a hole digging tool adapted to dig holes of various sizes and shapes.

Another object is to provide a tool adapted for effective removal of soil adjacent to the surface of the ground as well as deeply in a hole.

Another object is to provide a device adapted to remove broken stakes, posts, roots, and the like which are imbedded in the ground.

Other objects are to provide a digging tool which is simple and economical to construct and use, dependable in operation, durable in form, adapted to a variety of uses, and which is highly effective for accomplishing its intended purposes.

Other objects will become more fully apparent upon reference to the following description.

In the drawings:

Fig. 1 is a side elevation of a material handling tool embodying the principles of the present invention and shown penetrating the ground and with dot dash lines indicating alternate positions of the tool.

Fig. 2 is a somewhat enlarged longitudinal section of the tool shown in Fig. 1 and with a portion thereof being broken away in the middle for illustrative convenience.

Fig. 3 is a view similar to Fig. 2, although still further enlarged, but showing the shovels in closed position with a chisel held therebetween.

Fig. 4 is a transverse section taken on line 4—4 of Fig. 5.

Fig. 5 is a somewhat enlarged fragmentary side elevation of a portion of the tool as illustrated in Fig. 1.

Fig. 6 is a transverse section taken on line 6—6 of Fig. 5.

Fig. 7 is a somewhat enlarged perspective view of the chisel shown in Fig. 3.

Fig. 8 is a view similar to Fig. 2 but showing the tool in a different stage of its operation than in Fig. 2, dot-dash lines being employed to indicate material handled by the tool.

Fig. 9 is a fragmentary somewhat enlarged perspective view of the tool illustrated in Fig. 1 and with the shovels in an open position.

Fig. 10 is a fragmentary somewhat enlarged sectional view of a portion of the tool with a foot piece shown therein in retracted position.

Fig. 11 is a view similar to Fig. 10 with the foot piece being shown in extended position.

Referring more particularly to the drawings, a post hole digging tool is generally indicated by the numeral 10 in Fig. 1. The tool includes an elongated hollow tubular handle 11 having an upper externally threaded end 12 and a lower end 13 providing diametrically opposed apertures 14.

An elongated fixed channel-shaped jaw or shovel 20 provides an upper end rigidly secured to the lower end 13 of the handle 11 and a lower end longitudinally extended from the handle. The shovel includes a central flange 21 secured, as by welding, to the lower end of the handle and having an upper extension 22 also secured, as by welding, to the handle. The central portion has a lower sharpened edge, indicated at 23. The fixed shovel also has a pair of spaced parallel side flanges 24 tapered from the upper to the lower end of the shovel and also having lower sharpened edges 25. The side flanges have extensions 26 upwardly extended along the handle and rigidly secured thereto. The side extensions provide elongated slots 27 for a purpose to be described, and the side flanges provide aligned openings 28 below the slots.

An upper plate 30 rigidly interconnects the side flanges 24 of the fixed shovel 20 and is preferably also secured to the lower end 13 of the handle 11. The plate provides a central notch 31 and a pair of outer notches 32 in an outwardly disposed edge thereof.

A movable shovel 35 is constructed similarly to the fixed shovel and thus has a central flange 36 providing a lower sharpened edge 37, a pair of side flanges 38 having lower sharpened edges 39 and upper aligned openings 40 and being tapered from their upper to their lower ends. A tube 41 is fitted between the side flanges of the movable shovel coaxially with the openings 40. The movable shovel is fitted in face to face relation in the fixed shovel with their respective side flanges 24 and 38 in slidable engagement and with the openings 40 in registration with the openings 28. The shovels are mounted for pivotal movement between an open position for admitting work materials therebetween and a closed position for retaining such materials by means of a pin 43 extended through the openings 28 and 40 and the tube 41. A nut 44 is screw-threadably fitted on the pin for holding it in position. Further, a bar 46 is extended between the side flanges of the movable shovel slightly downwardly and inwardly spaced from the tube 41 for a purpose to be described.

An elongated U-shaped resilient control spring or arm 50 provides a pair of elongated outwardly bowed legs 51 having end portions received in the outer notches 32 and secured to the inner side of the central flange 36 of the movable shovel, and an intermediate member 52 interconnecting the legs. The legs are extended upwardly along the handle 11 and are curved inwardly toward the handle. A cam following roller 53 providing spaced annular grooves 54 is rotatably fitted on the intermediate portion of the resilient arm or member.

An elongated shovel positioning slide 60 of substantially cylindrical form is mounted for longitudinal slidable movement on the handle 11 and provides upper and lower ends. A pair of spaced, outwardly extended, substantially triangular camming flanges 62 are secured to the lower end of the slide and have camming edges 63 inclined outwardly and upwardly from the lower toward the upper end of the slide. The flanges 62 are spaced the same distance apart as the grooves of the cam roller and are adapted to receive such grooves for guided rolling movement of the roller thereover.

A rigid control lever 70 provides a lower end 71 fitted in the central notch 31 and rigidly connected to the inner side of the central flange of the movable shovel, an inwardly curved central portion 72, and an upper extended end 73 substantially parallel to the lower end. The control lever is positioned intermediate the legs 51 of the spring 50 and is for the purpose of holding the shovels 20 and 35 in predetermined spaced relation to each other as will be seen. Although the lever is described as being rigid the term is, of course, to be understood as a relative one; obviously upon application of sufficient force transversely thereof, the rod will flex slightly.

A guide bracket 76 provides a pair of spaced outwardly extended mounting arms 78 secured to the slide 60 below the camming member 61. A guide roller 79 is rotatably mounted on a pin 80 between the mounting arms. The extended end 73 of the control lever is received between the mounting arms of the guide bracket and engages the guide roller.

An elongated stem or rod 85 is positioned within the handle 11 and has a lower end 86 and an upper threaded end 87. A U-shaped catch 88 is rigidly secured to the lower end of the stem and is loosely fitted over the bar 46 connected to the movable shovel 35 so as to permit movement of the stem longitudinally in the handle relative to the bar. Conversely, the loose fit allows the bar to move within the catch as it pivots around the pin 43. A control sleeve 89 is provided with an internally threaded collar 90 threadably receiving the upper end 12 of the handle and has a central transverse disk 91 rotatably receiving the stem 85 therein. A stop wafer 92 is secured to the stem on one side of the disk, and nuts 93 are screw-threadably turned on the stem on the opposite side of the disk from the wafer for rotatably connecting the stem to the sleeve while preventing relative longitudinal movement therebetween. A knob 94 is frictionally fitted in an upper open end of the sleeve and when removed, permits access to the nuts 93.

A lug 95 is secured to the plate 30 adjacent the central notch 31. Coiled springs 96 are positioned on opposite sides of the lug and have longitudinal axes disposed in positions substantially parallel to the axis handle 11. The springs have inwardly extended ends 97 secured to the lug and opposite ends 98 extended away from the lug in substantially perpendicular relation to the ends secured to the lug on opposite sides of the handle, as best seen in Fig. 6. Footpieces 99 are extended through the slots 27 and have inner ends pivotally receiving the ends 98 of the springs therein and outer ends. The footpieces are thus movable between outwardly extended and upwardly extended positions on the spring ends. In their outwardly extended positions, as in Fig. 12, the footpieces are fulcrumed in the slots 27 and the inner ends of the footpieces extend into the apertures 14 and bear upwardly against the handle. When not in use, the footpieces are removed from the apertures and pivoted upwardly through the slots substantially parallel to the handle, as in Fig. 11, where they are retained by action of the springs.

The invention also provides a chisel 100 having a blade 101 including a knife edge 102. The chisel has a mounting flange 103 adapted to fit between the fixed and the movable shovels 20 and 35 in a manner to be described.

*Operation*

The operation of the described embodiment of the present invention is believed to be readily apparent and is briefly summarized at this point. In the normal operation of the post hole digging tool 10, the slide 60 is initially in its upper position with the spring 50 urging the movable shovel 35 toward the fixed shovel 20 but with the lever 70 engaging the guide roller 79 and preventing movement of the shovels beyond a predetermined minimum distance apart. This is shown in Figs. 1 and 10. It is also to be noted that normally, the control sleeve 89 is in a neutral position in the middle of the threads on the upper end 12 of the handle 11, as in Fig. 2. Movement of the control sleeve downwardly or upwardly on the handle from this neutral position serves to move the movable shovel outwardly or inwardly, respectively, relative to the position in which it is normally held by the control lever 70, as will be seen.

To dig a hole, the handle 11 is grasped in the hands between the control sleeve 89 and the slide 60 and the tool thrust downwardly into the ground. The lower edges 23, 25, 37, and 39 are in substantially rectangular relation and thus engage a substantially rectangular chunk of soil. The tool is repeatedly lifted and thrust downwardly against the area in which the hole is being dug so as to loosen the soil. In doing this, it may be necessary or desirable to pivot the footpieces 99 outwardly and to step thereon so as to increase the force with which the tool is urged into the ground. In this respect the use of the tool is somewhat similar to using an ordinary shovel.

When a quantity of dirt has been loosened, the shovels 20 and 35 are thrust into the dirt and the slide 60 moved downwardly along the handle 11. This causes the camming edges 63 to ride along the annular grooves 54 of the cam roller 53 thereby resiliently to urge the spring 50 outwardly of the handle. The spring in turn resiliently urges the movable shovel 35 toward the fixed shovel 20 and if the slide is moved to its lowermost extent, the movable shovel snaps closed against the fixed shovel to capture some dirt between the shovels. As the slide moves downwardly, the guide roller 79 moves over the inwardly curved central portion 72 of the control lever 70 so as to permit the spring to urge the movable shovel inwardly. The loose fit of the catch 88 over the bar 46 allows this pivotal movement of the movable shovel.

The tool 10 is then lifted out of the ground and carried to a convenient dumping point. During this time the slide 60 remains down so as to retain the dirt between the shovels 20 and 35. To release the dirt, the slide 60 is slid upwardly along the handle. This permits the roller 53 to ride down the camming edges 63 and to relieve the pressure exerted on the movable shovel by the spring 50. The movable shovel is moved away from the fixed shovel inasmuch as the guide roller 79 engages the extended end 73 of the control lever 70 and pivots the movable shovel outwardly. Thus, the dirt is released and the tool is ready for a subsequent digging operation.

The spacing between the shovels 20 and 35 may be adjusted from its neutral position by rotation of the control sleeve 89. For example, by rotating the control sleeve downwardly on the handle 11, the stem 85 is moved downwardly in the handle. The catch 88 engages the bar 46 and pivots the movable shovel 35 outwardly from the fixed shovel 20. Conversely, by rotating the control sleeve so that it moves upwardly along the handle, the stem is drawn upwardly to pull upwardly on the catch and to pull up on the bar to pivot the movable shovel inwardly toward the fixed shovel. In the usual operation of the tool, the control sleeve adjustment is used to enable the digging of holes either larger or smaller than could be dug with the shovels in their neutral position. After a portion of the hole has been dug with the control sleeve displaced from its neutral position, it may be returned to its neutral position, and the slide 60 operated as above described to remove dirt from the hole.

For digging in hardpan or for chopping roots or the like, the mounting portion 103 of the chisel 100 is placed between the lower ends of the shovels 20 and 35 and the control sleeve 89 turned downwardly on the handle 11 to close the shovels. This may also be accomplished by lowering the slide 60 but as will be understood, the control sleeve positively closes and maintains closed the shovels. With the chisel dependably held between the shovels, the knife edge 102 of the chisel 100 may be repeatedly thrust against the ground or a root. Thereafter the chisel may be removed from the shovels and the tool operated as previously described to remove the dirt or root.

The tool has a wide variety of uses besides the specific operation of digging holes. Thus, old grape stakes which have been broken off may be engaged between the shovels 20 and 35 and pulled out of the ground. The tool may be employed to test soils and soil moisture by removing soil samples with the shovels. Holes may be dug by the tool for effecting water and fertilizer penetration. It will be evident that holes may be dug with the tool of the present invention at a variety of angles such as might be required for setting a guy wire pole or stake. Additionally, the tool may be employed for digging holes sufficiently deep in the ground for deep root planting. Whenever deep holes are dug, it is important to note that the control sleeve 89 is very effective for closing the shovels 20 and 35 to capture dirt therebetween inasmuch as the slide 60 may not be accessible above the ground.

From the foregoing it will be evident that a tool has been provided for digging holes in the ground and for many other purposes which is easier to use, more efficient in operation, and which requires less time for accomplishing its intended purpose than prior art devices. Clearly, therefore, the subject invention is an important advance in the art.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a material handling tool, an elongated handle; first and second elongated pivotally interconnected jaw-like shovels relatively movable to and from each other between a relatively open position for admitting work materials therebetween, and a relatively closed position for retaining said materials; means rigidly interconnecting the first shovel and the handle with said first shovel in substantial alignment with the handle; an elongated resilient control member having an end rigidly secured to said second shovel and an opposite cam following end laterally adjacent to the handle; a slide mounted for longitudinal slidable movement on the handle; and a shovel control cam mounted on the slide and engageable with the cam following end of the control member for biasing said second shovel toward said first shovel and whereby upon movement of the slide in one direction along the handle the bias exerted by the control member is increased for urging the shovels into relatively closed position to compress work materials therebetween, and upon movement of the slide in an opposite direction along the handle the bias exerted by the control member is decreased to release such materials from the shovels.

2. In a material handling tool, an elongated handle; first and second elongated pivotally interconnected jaw-like shovels relatively movable to and from each other between a relatively open position for admitting work materials therebetween, and a relatively closed position for retaining said materials; means rigidly interconnecting the first shovel and the handle with said first shovel in substantial alignment with the handle; an elongated resilient control member having an end rigidly secured to said second shovel and an opposite cam following end laterally adjacent to the handle; a slide mounted for longitudinal slidable movement on the handle; a shovel control cam mounted on the slide and engageable with the cam following end of the control member for biasing said second shovel toward said first shovel and whereby upon movement of the slide in one direction along the handle the bias exerted by the control member is increased for urging the shovels into relatively closed position to compress work materials therebetween, and upon movement of the slide in an opposite direction along the handle the bias exerted by the control member is decreased to release such materials from the shovels; and engageable means borne by the second shovel and by the slide for resisting movement of the second shovel toward the first shovel in said relatively open position and for permitting movement of the shovels into said relatively closed position by the control member upon movement of the slide in said one direction along the handle.

3. The combination of claim 2 wherein said engageable means includes a guide rigidly mounted on the slide; and an elongated lever rigidly mounted on said second shovel, extended longitudinally along the handle and transversely of the guide, and being engageable with the guide in said relatively open position of the shovels for resisting movement of the shovels toward each other.

4. The combination of claim 2 wherein the cam provides a camming edge extended outwardly of the slide in substantially acute angular relationship with the handle; and wherein the resilient control member is a substantially U-shaped spring having a pair of legs rigidly connected to said second shovel and extended longitudinally of the handle away from the shovels, and a cam following end portion interconnecting the legs extended transversely of the handle and engageable with said camming edge.

5. The combination of claim 1 including a substantially U-shaped guide rigidly mounted on and transversely outwardly extended from the slide in longitudinally spaced relation to the cam; and an elongated lever having an end rigidly connected to said second shovel, an opposite guiding end extended longitudinally of the handle and within the guide for engagement with the guide in the relatively open position of the shovels for resisting inward pivotal movement of the second shovel toward the first shovel, and an intermediate portion inwardly curved toward the handle from said rigidly mounted and guiding ends, the guide being movable with the slide into opposed relation to said inwardly curved intermediate portion of the lever upon movement of the slide in said one direction along the handle for permitting movement of the second shovel toward the first shovel.

6. An earth digging tool comprising an elongated handle; a fixed shovel rigidly secured to the handle; a movable shovel pivotally connected to the fixed shovel for pivotal movement around a pivot axis toward and away from the fixed shovel between a relatively open position for admitting earth therebetween and for releasing said earth and a relatively closed position for holding earth received therebetween; a shovel positioning slide mounted for longitudinal slidable movement on the handle between positions relatively opening and closing the shovels; a guide member mounted on the slide in predetermined outwardly spaced relation thereto having an inner side disposed toward the slide; a rigid lever connected to the movable shovel having an end portion extended along the handle from said pivot axis in a direction opposite to the movable shovel and abutting the inner side of the guide member for limiting movement of the movable shovel toward the fixed shovel to a predetermined minimum distance apart when the shovels are in relatively open position, and having a central portion curved inwardly from the end portion toward the handle; an elongated resilient arm connected to the movable shovel having an end extended away from the movable shovel along the handle; and a cam secured to the slide engageable with said end portion of the arm incident to movement of the slide toward said position relatively closing the shovels yieldably to urge the movable shovel toward the fixed shovel, the inner side of the guide member moving into opposed relation to the central portion of the lever as the slide moves toward said position relatively closing the shovels to permit movement of the movable shovel toward the fixed shovel.

7. A tool for digging holes in the ground and for removing soil therefrom comprising an elongated handle having an upper end and a lower end; an elongated fixed channel-shaped shovel secured to the lower end of the handle and longitudinally extended therefrom; an elongated movable channel-shaped shovel interfitted in opposed facing relation in the fixed shovel; means hingedly interconnecting the shovels for movement around a predetermined axis toward and away from each other between a relatively open position and a relatively closed position; an elongated substantially cylindrical slide slidably fitted on the handle for movement between positions relatively opening and closing the shovels; a pair of spaced substantially parallel cam plates outwardly extended from the slide longitudinally of the handle, and having outwardly disposed camming edges downwardly and inwardly extended relative to the handle; a U-shaped control spring including a pair of elongated outwardly bowed, resilient legs rigidly connected to the movable shovel, extended upwardly along the handle, and interconnected by an intermediate end portion extended transversely of the slide; a cam following roller rotatably journalled on the intermediate portion of the control spring resiliently pressed against the slide by the control spring whereby the movable shovel is resiliently urged toward the fixed shovel, the cam following roller having a pair of spaced annular grooves aligned with and adapted to ride on the camming edges of the camming plates incident to longitudinal sliding movement of the slide between said positions relatively opening and closing the shovels; a guide bracket having a pair of spaced arms outwardly extended from the slide below the camming plates; a guide roller extended between the arms and mounted thereon for rotation around an axis transversely of the handle; and an elongated rigid lever having an end rigidly connected to the movable shovel between the legs of the spring, an opposite guiding end extended between the arms of the bracket and engagable with the guide roller, and a central portion inwardly curved from said ends toward the handle, said guiding end of the lever engaging the guide roller to maintain the shovels in predetermined spaced relation to each other when the slide is in said position relatively opening the shovels, and the guide roller moving into opposed relation to the central portion of the lever to permit movement of the shovels together when the slide is in said position relatively closing the shovels.

References Cited in the file of this patent
UNITED STATES PATENTS

| | | |
|---|---|---|
| 1,492,643 | Tarzelere | May 6, 1924 |
| 2,447,965 | Sparr | Aug. 24, 1948 |
| 2,715,770 | Meyer | Aug. 23, 1955 |